United States Patent [19]

Ohmura et al.

[11] Patent Number: 5,109,777

[45] Date of Patent: May 5, 1992

[54] CAR BODY FOR RAILWAY ROLLING STOCK WITH JOGGLED ADJACENT SIDE SHEET END CONSTRUCTION FOR SMOOTH EXTERIOR

[75] Inventors: Keiji Ohmura; Sumio Okuno; Michifumi Takeichi; Kentarou Masai; Seiichi Okamoto; Masatake Nakamura, all of Kudamatsu, Japan

[73] Assignee: Hitachi, Ltd., Tokyo, Japan

[21] Appl. No.: 564,620

[22] Filed: Aug. 9, 1990

[30] Foreign Application Priority Data

Aug. 9, 1989 [JP] Japan ................................. 1-204671

[51] Int. Cl.⁵ ............................................ B61D 17/08
[52] U.S. Cl. .................................... 105/401; 105/409; 403/339; 403/341
[58] Field of Search ................. 105/396, 397, 399, 401, 105/404, 407, 409; 296/183, 182, 187, 191; 403/339, 341, 271

[56] References Cited

U.S. PATENT DOCUMENTS

| | | | |
|---|---|---|---|
| 2,405,793 | 8/1946 | Lohse | 105/401 X |
| 2,575,454 | 11/1951 | Kuhler | 105/397 |
| 3,028,192 | 4/1962 | Jewell | 296/183 |
| 4,187,407 | 10/1980 | Marko, Jr. | 403/271 X |
| 4,227,824 | 10/1980 | Ikawa | 403/271 |
| 4,337,708 | 7/1982 | Peterson | 105/397 |

Primary Examiner—Robert J. Oberleitner
Assistant Examiner—S. Joseph Morano
Attorney, Agent, or Firm—Antonelli, Terry, Stout & Kraus

[57] ABSTRACT

A car body for railway rolling stock wherein a plurality of outside plates forming the car body are joined to frame members of the car body by spot welding. The outside plates are produced of a ferrous material except for stainless steel and a film or coating is provided on an outside surface of the outside plates. By virtue of the joining of the outside plates to the frame members and the joining of the outside plates to each other by spot welding, less input heat is required as compared with a continuous welding; therefore, outside plate distortion can be reduced and time and labor for manufacturing of the car body can be reduced. Moreover, since the outside plates are produced of a ferrous material, the painting of the outside surfaces of the outside plates can easily be accomplished.

1 Claim, 5 Drawing Sheets

CAR BODY FOR RAILWAY ROLLING STOCK WITH JOGGLED ADJACENT SIDE SHEET END CONSTRUCTION FOR SMOOTH EXTERIOR

BACKGROUND OF THE INVENTION

1. Field of the Invention

The present invention relates to a car body for railway rolling stock with painted outside surfaces.

2. Description of the Prior Art

A conventional car body for railway rolling stock using Superior Atmospheric Corrosion Resisting steel plates as outside plates is disclosed, for example, in Technique of Rolling Stock No. 173, page 20, February, 1986. The outside plates include side, end and roof plates with painted surfaces, with the outside plates being joined to a body framing in a manner described, for example, in Introduction to the Engineering of Passenger Train, pages 150 to 152, July, 1986, Railway System Research Ltd. The body framing is built up by assembling and joining a plurality of framing members. Each of the outside plates is made up by joining, by continuous butt welding, the ends of the plates cut into a required shape of the outside plates being joined to the body framing by spot welding.

Generally, in the car body for railway rolling stock, side plates comprising side framings included in a plurality of outside plates serve as important load-bearing members which support vertical loads acting on the car body. Therefore, when a plurality of side plates are to be welded, each plate is conventionally joined by continuous welding.

Since each outside plate comprises a plurality of plates joined by continuous welding, the plate is subject to surface distortion resulting from welding heat input. Distortion that has taken place in the outside plate is eliminated, after welding to the body framing, by first locally heating the outside plate and then cooling with water. After the removal of the distortion from the outside plate, minor distortion, if present, is covered by applying putty thereon. Thereafter, the surface of each outside plate is painted, thus completing the car body.

In the above-mentioned car body for railway rolling stock, as the outside plate is produced of Superior Atmospheric Corrosion Resisting steel plates, it requires surface protection with painting. In order to provide the car body surface of improved appearance, it is essential to remove the distortion of the outside plate. For the elimination of distortion of the outside plate, as described above, heating and rapid cooling of the outside plate itself are imperative. The outside plate described above takes much time and labor for the removal of distortion. Putty application to the outside plate surface also requires much time and labor.

A car body employing stainless steel outside plates is disclosed, for example, in Japanese Utility Model Publication No. 63-8535 (1988) with the car body including a framing formed by assembling and joining a plurality of framing members and a plurality of stainless steel outside plates by spot welding. Generally, the stainless steel outside plate, when surface painted, requires a special surface treatment. Therefore, most car bodies using the stainless steel outside plates are not surface painted. However, even in the car body with such stainless steel outside plates, the surface of the outside plate is subject to distortion. Therefore the car body with the stainless steel outside plates uses outside plates of waveform section. This type of waving outside plate has a complicated joining construction for joining the end thereof to the framing, requiring much time and labor in the manufacture of the car body provided with the stainless outside plates of the waveform section.

SUMMARY OF THE INVENTION

An object of the present invention resides in providing a car body for railway rolling stock using outside plates produced of ferrous materials exclusive of stainless steel and surface painted with less time and labor in the manufacture of the car body than conventional car bodies.

It is another object of the present invention to provide a car body for railway rolling stock for which body appearance can be improved by providing a substantially flat the outside car body surface.

It is a further object of the present invention to provide a car body for railway rolling stock which is capable of preventing paint film cracks on the outside plate surface.

BRIEF DESCRIPTION OF THE DRAWINGS

The present invention will become more fully understood from the detailed description given hereinbelow and the accompanying drawings which are given by way of illustration, and thus are not limitative of the present invention and wherein.

DESCRIPTION OF THE PREFERRED EMBODIMENTS

Figure 1:
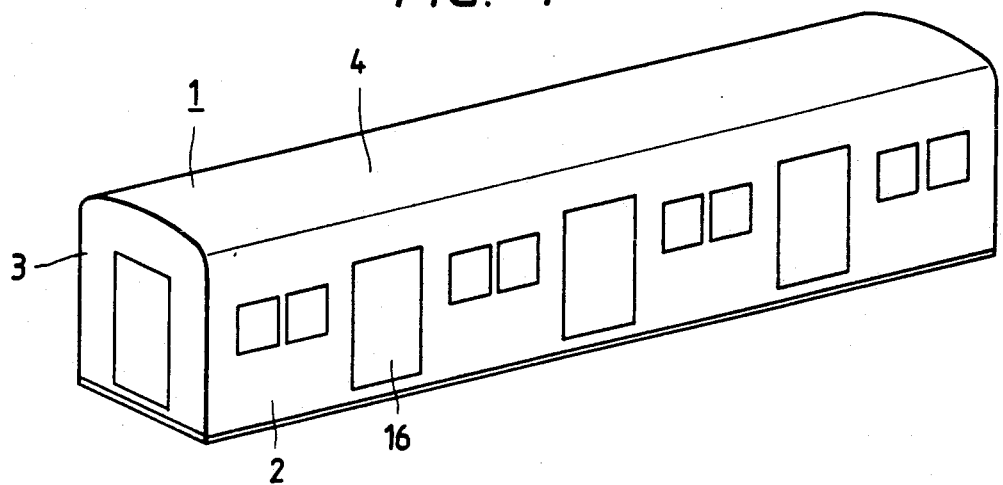
FIG. 1 is a perspective view showing a car body for railway rolling stock according to a first embodiment of the present invention.
Figure 2:
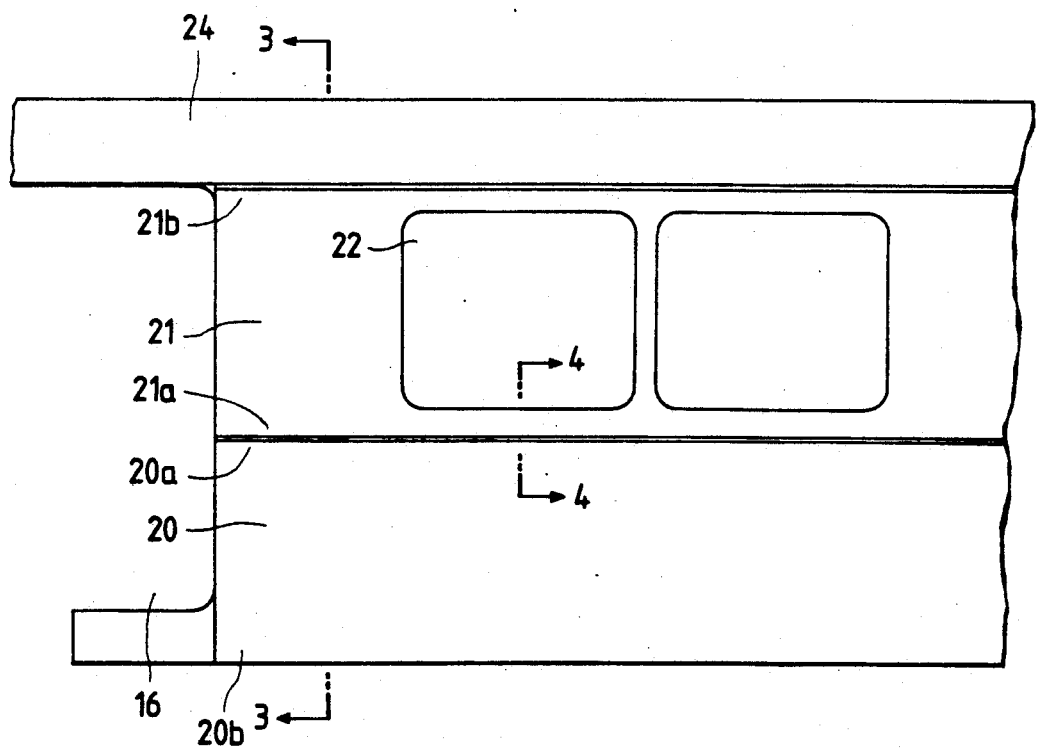
FIG. 2 is a partial side view, on an enlarged scale, of the car body of FIG. 1 before painting.
Figure 3:
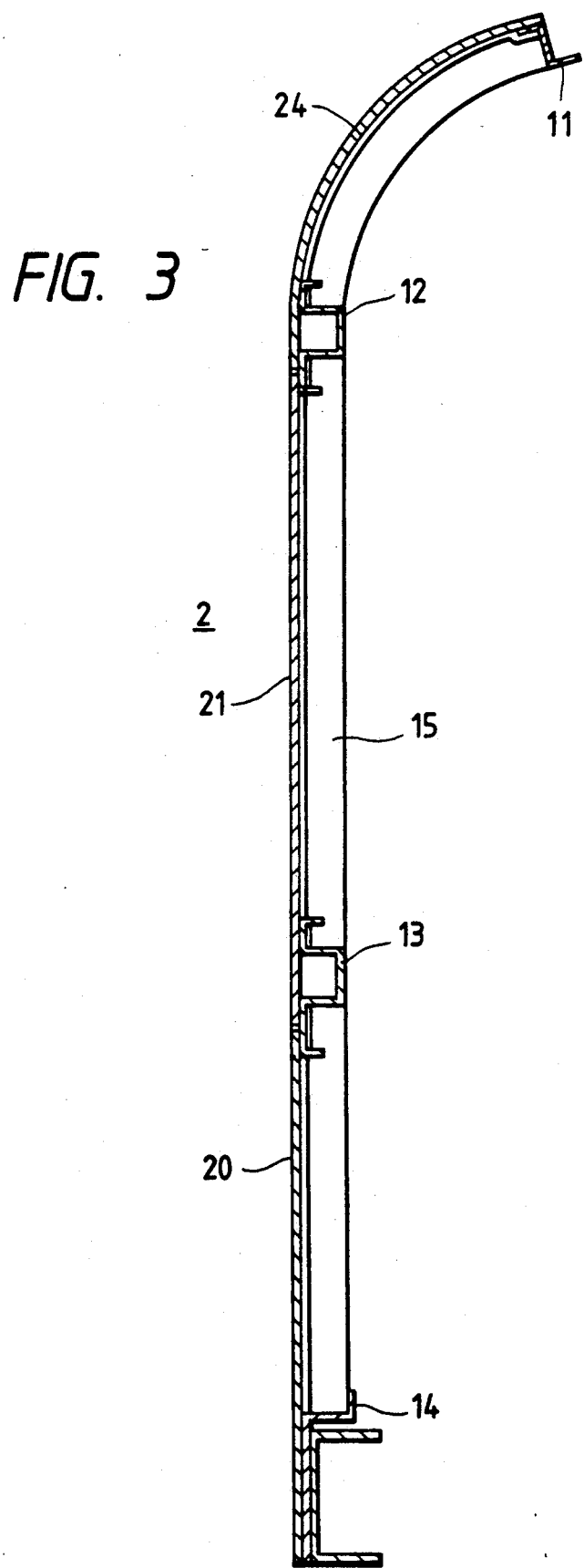
FIG. 3 is a sectional view, on an enlarged scale, taken along the line 3—3 in FIG. 2.

Referring now to the drawings wherein like reference numerals are used throughout the various views to designate like parts and, more particularly, to FIGS. 1 to 4. According to these figures, a car body 1 includes two side framings, two end framings 3, a roof framing 4 and an underframe (not illustrated), with each of the side framings 2, end framings 3, and roof framing 4 is being formed by joining outside plates to the framing built by assembling and joining a plurality of frame members. The construction of the side framing 2 will be described in particular as a typical example of the construction of the side framings 2, the end framings 3, and the roof framing 4. The side framing 2, as shown most clearly in FIG. 3, comprises a cant rail 11 extending in the longitudinal direction of the car body, a window head 12, a belt rail 13, a rocker rail 14, and a plurality of side posts 15 extending in the vertical direction of the car body. Each frame member is joined by a gusset (not illustrated). The cant rail 11, the window head 12 and the rocker rail 14 are installed over the length of the car body 1 in the longitudinal direction of the car body 1. The belt rail 13 is installed between a plurality of side doors 16 provided in the car body 1. The frame members have outside plate joining faces near the outside surface of the car body. The window head 12 and the belt rail 13 have a hat-type sectional form. The cant rail 11 and the rocker rail 14 have a Z-section. Wainscot panel 20 is arranged between the belt rail 13 and the rocker rail 14. The wainscot panel 20 is joined at the lower end to the joint surface of outside plates of the rocker rail 14, and at the upper end to the joint surface of the outside plate of the belt rail 13. The end and intermediate portions of the wainscot panel 20, in the longitudinal direction of the car body, are joined to the side posts 15. A pier panel 21 is installed between the belt rail 13 and the window head 12. The lower end of the pier panel 21 is joined to the belt rail 13. The upper end of the pier panel 21 is joined to the window head 12. The end and intermediate portions of the pier panel 21, in the longitudinal direction of the car body, are joined to the side posts 15. The pier panel 21 is provided with a window opening 22 for the formation of a window. The length of the wainscot panel 20 and the pier panel 21 in the longitudinal direction of the car body substantially corresponds to a spacing of a plurality of side doors 16 or a distance from the side door 16 to the car end section. Outside plates including the wainscot panels 20, the pier panels 21, frieze boards 24, etc. are produced of for example Superior Atmospheric Corrosion-Resisting Rolled Steels (JIS: SPA). The outside plates are fashioned of a ferrous materials except stainless steels. The frame members such as cant rail 11, window head 12, belt rail 13, and rocker rail 14, are produced of, for example, Super Atmospheric Corrosion-Resisting Rolled Steels (JIS: SPA). The frame members are fashioned of ferrous materials except stainless steels. In the following description, the ferrous materials except the stainless steels are simply stated the "ferrous materials."

Next, the structure of joining sections at which the wainscot panel 20 and the pier panel 21 are joined to the belt rail 13 will be described in detail with reference to FIG. 4. The belt rail 13 has flange sections 13c and 13d at the upper end section 13a and at the lower end section 13b respectively. Immediately behind the flange sections 13c and 13d are formed outside plate joint surfaces 13e and 13f to which the wainscot panel 20 and the pier panel 21 which constitute the outside plates are joined. The flange sections 13c and 13d are arranged at right angles with the outside plate joint surfaces 13e and 13f. To the outside plate joint surface 13e is joined a part equivalent to the edge of the window opening section 22 of the pier panel 21. Furthermore, to the outside plate joint surface 13f are joined the upper end 20a of the wainscot panel 20 and the lower end 21a of the pier panel 21.

The wainscot panel 20 and the pier panel 21 are formed flat throughout. The wainscot panel 20 is joined at the upper end section 20a to the belt rail 13 by spot welding. The wainscot panel 20 is joined at the lower end to the rocker rail 14 by spot welding, and at both ends in the longitudinal direction of the car body to the side posts 15 by spot welding. Namely, the wainscot panel 20 is joined to the framing at all of the periphery thereof by spot welding. The pier panel 21 is joined at the lower end section 21a to the belt rail 13 by spot welding, and at the upper end section 21b to the window head 12 by spot welding. Both ends of the pier panel 21 in the longitudinal direction of the car body are joined to the side posts 15 by spot welding. The pier panel 21 is joined at the periphery to the frame by spot welding. A part enclosing the window opening section 22 of the pier panel 21 is joined to the belt rail 13, window head 12, and side post 15 by spot welding. Since the wainscot panel 20 and the pier panel 21 are directly joined at all of the periphery to the framing, the vertical load acting on the whole body of the car body 1 is borne as loads within the plane (shear load and bending load) of the wainscot panel 20 and the pier panel 21. Numeral 19 in FIG. 4 denotes a spot-welded section.

A clearance is provided between the upper end section 20a of the wainscot panel 20 and the lower end section 21a of the pier panel 21, which are both joined to the belt rail 13. The clearance is wide enough to easily accommodate fill putty 23. The outside surface of the putty 23 is flush with the outside surface of the wainscot panel 20 and the pier panel 21. The surfaces of the wainscot panel 20, pier panel 21, and putty 23 are painted to form a film of coating 25.

A putty 23 most commonly used is polyester resin. Also for painting to form the film of coating is most commonly adopted a phthalic or acrylic resin.

The frieze board 24 is joined at the lower end section to the outside plate joint surface of the window head 12, and at the upper end section to the outside plate joint surface of the cant rail 11. The end section of the frieze board 24, in the longitudinal direction of the car body, is joined to the outside plate joint surface of a corner post (not shown). The intermediate section of the frieze board 24 in the longitudinal direction of the car body is joined to a plurality of side posts 15. The frieze board 24 is joined to the window head 12, the cant rail 11, the corner post and the side post 15 all by spot welding.

To manufacture the side framing 2, first the cant rail 11, the window head 12, the belt rail 13, the rocker rail 14, the side post 15 and the corner post are assembled and joined to form a framing. This joining of each frame member is accomplish through a gusset. To the outside surface of the framing are joined the wainscot panel 20, the pier panel 21 and the frieze board 24.

In the meantime, the end framing 3 and the roof framing 4 also are fashioned by joining the outside plate after forming the framing similarly to the side framing 2. Furthermore, the underframe is made by joining a keystone plate to the upper surface after thus making the framing.

The two side framings 2, two end framings 3, roof framing 4 and underframe thus manufactured are assembled and joined to build the car body 1. Subsequently, the outside surface of the car body 1 is finished. First, the putty 23 is filled in the clearance between the adjacent outside plate, for example, the wainscot panel 20, and the pier panel 21. The putty 23 is thick enough to form a surface flush with the surface of the wainscot panel 20 and the pier panel 21. There is also provided a clearance between the adjacent pier panel 21 and the frieze board 24, with the latter clearance also being filled putty. Furthermore, distortion of the outside surfaces of the wainscot panel 20, the pier panel 21 and frieze board 24 is covered by applying the putty thereon. The distortion of the outside surfaces of the wainscot panel 20, the pier panel 21 and the frieze board 24 is very little as compared with that in conventional car bodies which are formed by joining outside plates by continuous welding. Therefore, a small amount of putty is required to cover the distortion of the outside surface of the wainscot panel 20, the pier panel 21 and the frieze board 24 as compared with that required in conventional car bodies. The car body 1 surface is then painted after the completion of the surface finish of the car body 1.

The car body 1 is of such a construction that the wainscot panel 20, the pier panel 21, the frieze board 24 and other outside plates are all respectively joined to the framings by spot welding, thereby decreasing the distortion resulting from the input of welding heat to the outside plate as compared with conventional car bodies. Therefore, when the aforementioned construction of the car body 1 is adopted, the elimination of distortion by heating and cooling the outside plates is not required and, accordingly, it is possible to reduce the car body manufacturing time and labor as compared with conventional car bodies. At the time of manufacture of the car body 1, the amount of distortion elimination work of the car body 1 is very little as compared with conventional car bodies. According to the construction of the car body 1, since the time and labor required for the manufacture of the car body can be decreased, it is possible to build the car body 1 at the lower cost. The clearance provided between adjacent outside plates such as the wainscot panel 20, pier panel 21, and frieze board 24 is wide enough to allow easy putty application Therefore, application of the putty 23 into the clearance can be performed with ease. Moreover, since putty 23 fully fill the clearance, the film of coating 25 is never subjected to cracking. Since, in the car body 1, the surfaces of outside plates such as the wainscot panel 20, pier panel 21 and frieze board 24 are flat and smooth, there is the advantage that dust does not attach on the outside surfaces. It is, therefore, possible to prevent the staining of the surfaces of the car body 1, particularly the surfaces of the side framing 2 and the end framing 3. Because the outside plates and framings are produced of superior atmospheric corrosion-resisting rolled steels, the material cost of the car body 1 can be made lower than that of the stainless car body.

Because a clearance is provided between adjacent outside plates such as the wainscot panel 20, the pier panel 21, the frieze board, etc. the position of each outside plate can be easily adjusted if the outside plates are manufactured with a low accuracy, thus facilitating the joining of each outside plate to the framing.

The outside plates such as the wainscot panel 20, the pier panel 21 and the frieze board 24, all directly joined at their periphery to the framing, serve as load-bearing members which support the vertical load of the car body 1. Therefore, the outside plates can enhance the strength of the car body 1, thereby enabling a decrease in the thickness of such frame members as the cant rail 11, the window head 12, the belt rail 13, the rocker rail 14 and the side post 15. That is, the use of these outside plates is effective to decrease the weight of the car body 1.

In the description of a first embodiment, the construction of the joint section for joining the wainscot panel 20 and the pier panel 21 to the belt rail 13 has been explained. The above construction of the joint sections between the adjacent outside plates and the framing is applicable also to each joint section between the pier panel 21 and the frieze board 24, between the frieze 24 board and the roof sheet, and between an adjacent roof sheet and an adjacent end plate.

Figure 4:
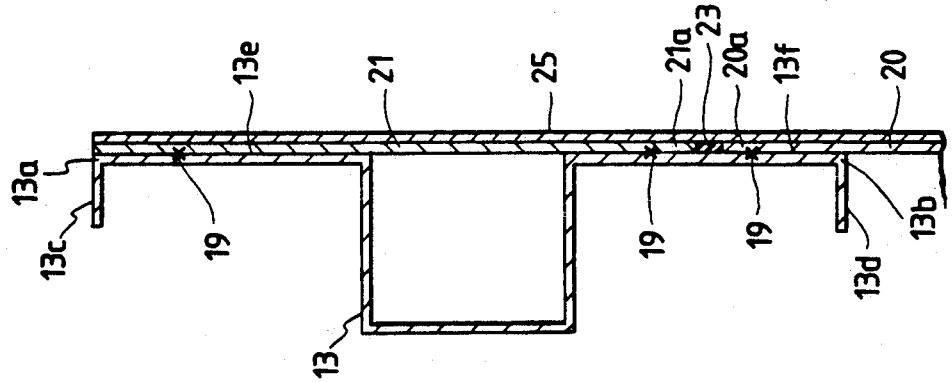
FIG. 4 is a sectional view, on an enlarged scale, taken along the line 4—4 in FIG 2.
Figure 5:
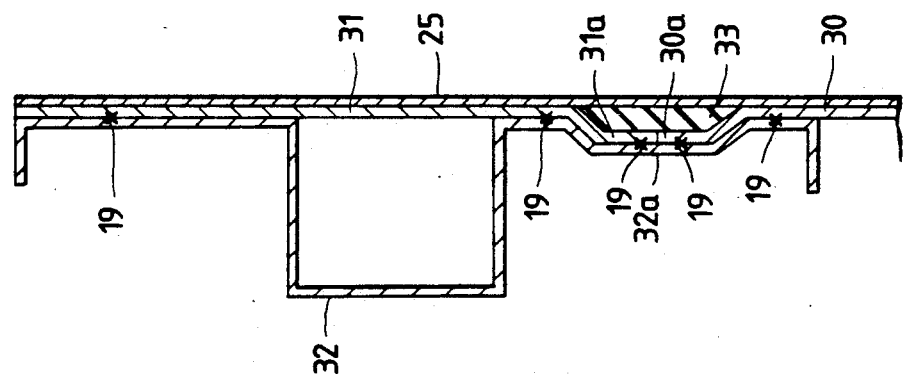
FIG. 5 is a sectional view of a plurality of outside plates and framings according to a second embodiment of the present invention.

FIG. 5 illustrates the joint section of adjacent outside plates, and provides an example of similar joint sections of the wainscot panel and the pier panel joined to the belt rail as shown in FIG. 4. The wainscot panel 30 has, at the upper end section 30a a joggled section projecting inwardly of the car body. The pier panel 31 also has, at the lower end section 31a, a joggled section formed projecting inwardly of the car body. The belt rail 32 to which the upper end section 30a of the wainscot panel 30 and the lower end section 31a of the pier panel 31 are joined has, in the outside plate joint surface, a recess 32a formed inwardly of a passenger compartment of the car body. This recess 32a is continuously formed in the belt rail 32 in the longitudinal direction of the car body. The width of the recess 32a corresponds to the width of the joggled section of the upper end section 30a and the lower end section 31a. The sectional form of the recess 32a in the direction of width corresponds with that of the joggled section of the upper end section 30a and the lower end section 31a. The ends of both the upper end section 30a and the lower end section 31a are closely abutted to each other without a clearance therebetween. This clearance may be provided and widened to facilitate butting the ends of the wainscot panel 30 and the pier panel 31. The wainscot panel 30 and the pier panel 31 are joined to the belt rail 32 with the joggled sections of their upper end section 30a and lower end section 31a overlapped with the 32a of the belt rail 32. A covering material 33 is accommodated in the recess formed with the joggled section of the upper end section 30a and the lower end section 31a. The outside surface of the covering material 33 is formed uninterruptedly flush with the outside surface of the wainscot panel 30 and the pier panel 31. There is formed a film of coating by painting the outside surfaces of the wainscot panel 30, the pier panel 31 and the covering material 33. In FIG. 5, numeral 19 denotes a joint section of the outside plate and the frame member joined by spot welding.

The belt rail 32 is assembled and joined to other frame member to form the framing. Of the other frame members forming the framing, a recess is similarly formed in the frame member, such as a window head or the side post, which has an outside plate joint surface to which an adjacent outside member, such as the belt rail 32 is joined. The outside plate to be joined to the frame member provided with the recess has a stepped section at the end thereof.

According to the construction of the embodiment of FIG. 5, a similar effect as in the case of the first embodiment is attainable. Also, according to the embodiment of FIG. 5, no surface unevenness appears at the butted section in the outside surface of the coating 25 because the outside surface of the butted section between the wainscot panel 30 and the pier panel 31 is coated with the covering material 33. Accordingly it is possible to provide a smooth outside surface of the butted section of the wainscot panel 30 and the pier panel 31, that is, the joint section of the outside plate.

Further according to the embodiment of FIG. 5, the outside plate with a joggled section, such as the wainscot panel 30 and the pier panel 31, has a greater bending rigidity than the outside plate having a flat surface throughout. This is because the joggled sections of the wainscot panel 30 and the pier panel 31 are overlapped with a recess 32a of the belt rail 32. It is possible to provide the car body with a greater strength to the vertical load by providing both the wainscot panel 30 and the pier panel 31 with the joggled section and further by providing the belt rail 32 with the recess 32a. The embodiment of FIG. 6 has almost the same construction as the embodiment of FIG. 5, but differs from the embodiment of FIG. 5 in that a film of coating 25a is directly formed on the surfaces of the wainscot panel 30 and the pier panel 31 joined to the belt rail 32. A recess is formed in the outside surface of the film or coating 25a corresponding to the joggled section of the wainscot panel 30 and the pier panel 31. In this recess is set the covering material 33a. The outside surface of this covering material 33a is uninterrupted and flush with the outside surface of the film of coating 25a formed on other than the joggled section of the wainscot panel 30 and the pier panel 31. Numeral 19 in FIG. 6 denotes joint sections between the wainscot panel 30 and the pier panel 31 and the belt rail 32 joined by spot welding.

Figure 6:
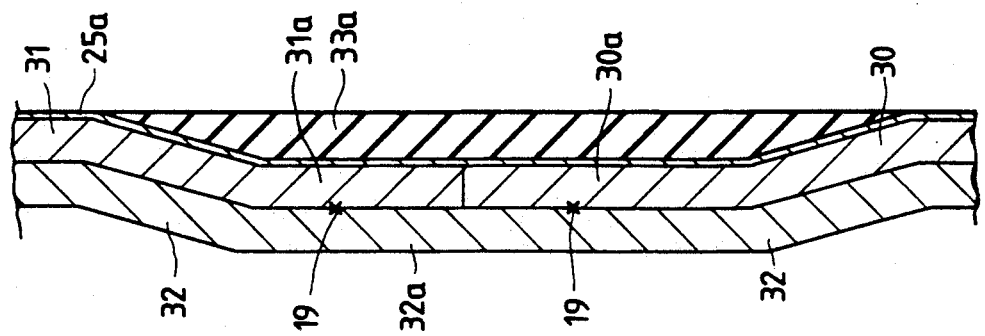
FIG. 6 is a sectional view of a plurality of outside plates and framings according to a third embodiment of the present invention.

A similar effect as in the embodiment of FIG. 5 can be attained by the use of the car body of the construction of the embodiment of FIG. 6. Also, according to the construction of the embodiment of FIG. 6, the outside surface of the film or coating 25a is covered with the covering material 33a. Therefore, no cracking in the outside surface of the car body if the film of coating 25a is cracked by the effect of the butted section of the wainscot panel 30 and the pier panel 31. The covering material 33 can serve as a decorative line formed on the side surface of the car body by using different colors for the covering material 33a and the film of coating 25a. In this case, the covering material 33a produced of synthetic resin tape coated with an adhesive on the side which comes in contact with the film of coating will easily be attached on the car body.

Figure 7:
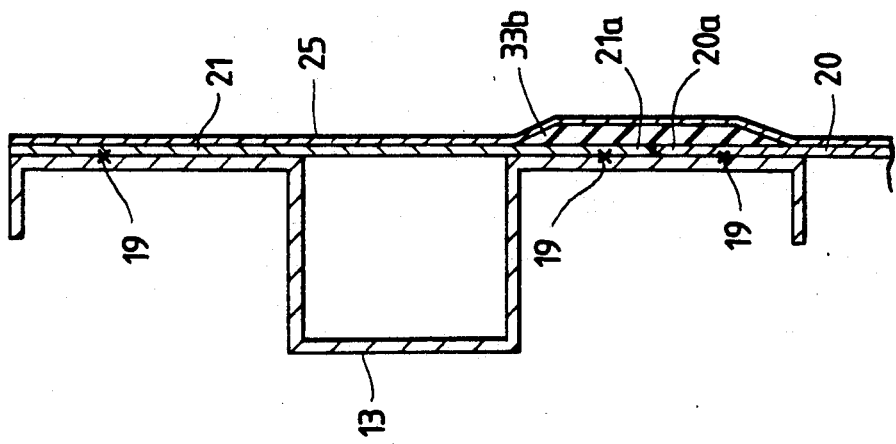
FIG. 7 is a sectional view of a plurality of outside plates and framings according to a fourth embodiment of the present invention.

The car body according to the embodiment of FIGS. 7 is of such a construction that the upper end section 20a of the wainscot panel 20 and the lower end section 21a of the pier panel 21 are butted without a clearance. The wainscot panel 20 and the pier panel 21 are jointed to the belt rail 13 by spot welding. Numeral 19 denotes a joint section of the wainscot panel 20 and pier panel 21 and the belt rail 13 which are joined by spot welding. The outside surfaces of the upper end section 20a and the lower end section 21a are covered with the covering material 33b. On the outside surfaces of the covering material 33b, the wainscot panel 20 and the pier panel 21 is formed a film of coating.

According to the embodiment of FIG. 7, it is possible to prevent the occurrence of cracks in the surface of the coating 25 by covering the outside surface of the butted section of the wainscot panel 20 and the pier panel with the covering material 33b. The installation of the covering material 33b on the surfaces of the wainscot panel 20 and the pier panel 21 can be facilitated by the use of a synthetic resin tape as the covering material which is applied with an adhesive on the contact surface which comes in contact with the film of coating. The embodiment of FIG. 7, therefore, facilitates car body assembling work more than the first embodiment in which putty is filled in a clearance between the wainscot panel 20 and the pier panel 21. The outside surface of the covering material 33b projects out of the outside surfaces of the wainscot panel 20 and the pier panel 21. However, since the outside surface of the material 33b, the wainscot panel 20 and the pier panel 21 are covered with the film or coating 25, the outside surface of the car body maintains good outward appearance.

In the embodiment of FIG. 7, the outside surface of the covering material 33b is covered with the film or coating 25. However, the covering material may be affixed after the formation of a coat on the outside surfaces of the upper end section of the wainscot panel and the lower end section of the pier panel. In the case of a car body of such a construction, the same effect can be attained as in the embodiment of FIG. 8.

Figure 8:
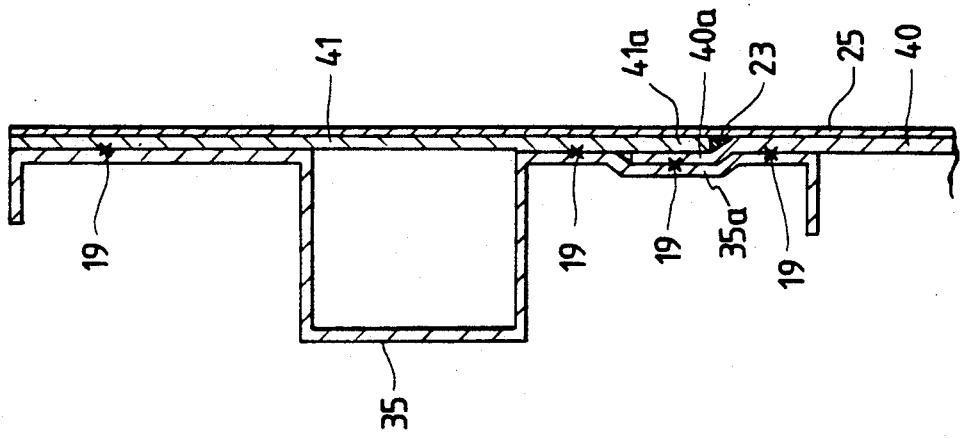
FIG. 8 is a sectional view of a plurality of outside plates and framings according to a fifth embodiment of the present invention.

The car body according to the embodiment of FIG. 8 is of such a construction that the upper end section 40a of the wainscot panel 40 and the lower end section 41a of the pier panel 41 are lap-jointed. At the upper end section 40a of the wainscot panel 40, a joggled section is formed projecting inwardly of the car body. A difference in height between the outside surface of the joggled section and that of other than the joggled section corresponds to the thickness of the pier panel 41. The wainscot panel 40 and the pier panel 41 are joined with the lower end section 41a lapped on the joggled section at the upper end section 40a. The outside surfaces of the wainscot panel 40 and the pier panel 41 are flush with each other. When the wainscot panel 40 and the pier panel 41 are assembled, a depression occurs in the lower end section of the pier panel 41, with the depression being filled with putty. The outside plate joint surface of the wainscot panel 35 is provided with a recess 35a formed in the position corresponding to the lap-joint section joined with the wainscot panel 40 and the pier panel 41. The depth of the recess 35a agrees with the thickness of the outside plate, or the pier panel 41. The recess 35a is wide enough to permit the fitting of the joggled section of the wainscot panel 40 therein. Accordingly, when the wainscot panel 40 and the pier panel 41 have been joined to the belt rail 35, the outside surfaces of the wainscot panel 40 and the pier panel 41 are flush with each other. On the outside surfaces of the wainscot panel 40 and the pier panel 41 is formed the film or coating 25. The surface of the film or coating 25 is uninterrupted and level. Joining the wainscot panel 40 to the pier panel 41, the wainscot panel 40 to the belt rail 35, and the pier panel 41 to the belt rail 35 is all accomplished by spot welding. Numeral 19 denotes the joined section by spot welding.

According to the construction of the car body of the embodiment of FIG. 8, a similar effect as the first embodiment can be attained. Also according to the the embodiment of FIG. 8, the wainscot panel 40 and the pier panel 41 are joined directly, thereby enabling smooth transmission of plane load between the wainscot panel 40 and the pier panel 41 and improvements in the strength and rigidity of these joint sections. The upper end section 40a of the wainscot 40, the lower end section 41a of the pier panel 41, and the outside plate joint surface of the belt rail 35 are all lapped and then joined by spot welding. Therefore, it is possible to decrease the number of spot-welding points in the embodiment of FIG. 8 more than in the embodiment of FIG. 5, which is effective for the reduction of time and labor required for the manufacture of the car body.

In the description of the embodiment of FIG. 8, the construction of the joint section between the wainscot panel 40 and the belt rail 35 of the pier panel 41 has been exemplified. The construction of the joint section between the adjacent outside plate and the framing is applicable to the joint section between the pier panel and the frieze board, between the frieze board and the roof outside plate between the adjacent roof outside In the embodiment of FIG. 9 the belt rail 36 differs in construction from the belt rail 35 of the embodiment of FIG. 8 in that the belt rail 36 has two outside plate joint surfaces 36a and 36b as the belt rail of each of the aforesaid wainscot panels. At the outside plate joint surfaces 36a, the upper end section 40a of the wainscot panel 40 and the lower end section 41a of the pier panel 41 are lap-jointed. To the outside plate joint surface 36b is joined the pier panel 41. The outside plate joint surface 36a is formed shifted from the outside plate joint surface 36b inwardly of the car body. This difference between the outside plate joint surface 36a and the outside plate joint surface 36b corresponds to the thickness of the wainscot panel 40. The belt rail 36 is manufactured generally by folding a flat plate. The difference between the outside plate joint surface 36a and the outside plate joint surface 36b can easily be provided simply by shifting the folding position at the time of manufacture of the wainscot panel 36. Spot welding is also applied to joining the wainscot panel 40 to the pier panel 41, the wainscot panel 40 to the belt rail 35, and the pier panel 41 to the belt rail 35. Numeral 19 denotes a joint section to be joined by spot welding.

Figure 9:
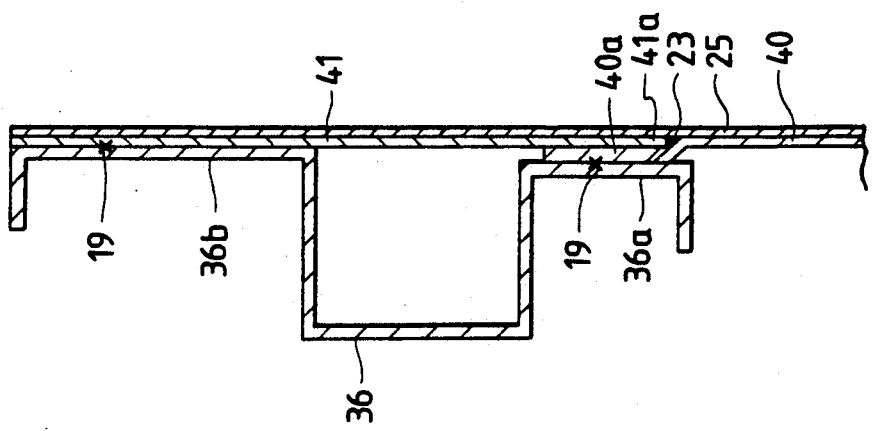
FIG. 9 is a sectional view of a plurality of outside plates and framings according to a sixth embodiment of the present invention.

According to the embodiment of FIG. 9, a similar effect as in the case of the embodiment of FIG. 8 can be obtained. Also according to the construction of the embodiment of FIG. 9, because no recess formation in the outside plate joint surface of the belt rail 36 is needed, the manufacture of the belt rail 36 can be performed easier than that in the embodiment of FIG. 8. Furthermore, since there is no recess in the outside plate joint surface of the belt rail 36, the positioning of the belt rail 36, the wainscot panel 40 and the pier panel 41 can easily be performed, thereby decreasing the time and labor required for the manufacture of the car body more than the embodiment of FIG. 8. Furthermore, according to the construction of the embodiment of FIG. 9, the number of spot-welding points of joint sections 19 can be reduced as compared with the embodiment of FIG. 8.

In the description of the embodiment of FIG. 9, the construction of the wainscot panel and pier panel to the belt rail joint sections has been explained by way of example. The construction of the joint sections between an adjacent outside plate and the framing is applicable to each joint section between the pier panel and the frieze board, between the frieze board and the roof outside plate, and between an adjacent roof outside plate and an adjacent end outside plate.

Figure 10:
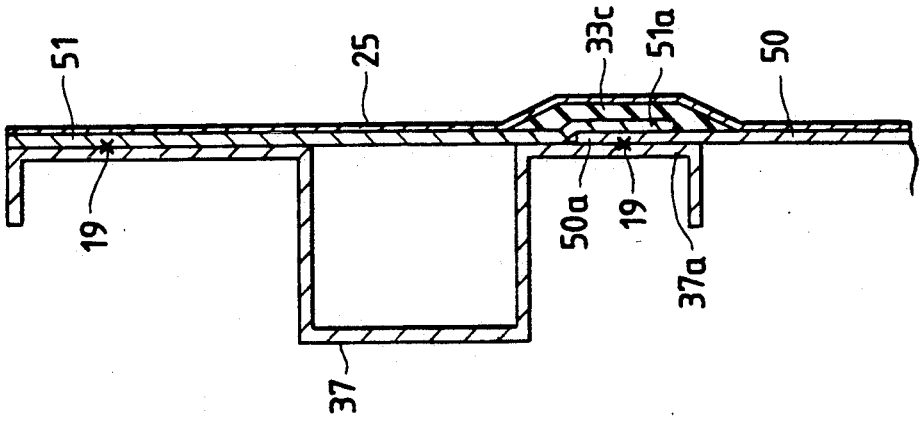
FIG. 10 is a sectional view of a plurality of outside plates and framings according to a seventh embodiment of the present invention.

In the embodiment of FIG. 10, the pier panel 51 has, at the lower end section 51a thereof, a joggled section formed to project outwardly of the car body. The wainscot panel 50 and the pier panel 51 are joined with the joggled section of the lower end section 51a lapped on the upper end section 50a of the wainscot panel 50. The lapped section of the upper end section 50a and the lower end section 51a is joined to the outside plate joint surface of the belt rail 37. That is, the belt rail 37, the wainscot panel 50 and the pier panel 51 are joined by spot welding at the lapped section. The outside surfaces of the joint section of the belt rail 37, the wainscot panel 50 and the pier panel 51, that is, the outside surfaces at the joggled section of the pier panel 51, are covered with the covering material 33c. This covering material 33c is attached so as to have a smooth surface. The outside surface of each of the covering material 33c, the wainscot panel 50, and the pier panel 51, is provided with a film or coating 25. Spot welding is adopted to join the wainscot panel 50 to the pier panel 51, the wainscot panel 50 to the belt rail 37, and the pier panel 51 to the belt rail 37. Numeral 19 denotes the joint section joined by spot welding.

According to the construction of the embodiment of FIG. 10, the wainscot panel 50 and the pier panel 51 are directly joined to each other. Accordingly, the plane load can be smoothly transmitted between the wainscot panel 50 and the pier panel 51, thus enhancing the strength and rigidity of these joint sections. The upper end section 50a of the wainscot panel 50, the lower end section 51a of the pier panel 51, and the outside plate joint surfaces of the belt rail 37 are all spot-welded in a lapped state. Therefore, it is possible to decrease the number of spot-welded joint sections 19 as compared with the first embodiment. This is effective to decrease the time and labor necessary for the manufacturing of the car body. In the construction according to the embodiment of FIG. 10, the outside surface of the car body projects outwardly of the car body in a position corresponding to the joggled section of the pier panel 51. However, the external appearance of the car body will not be deteriorated because the outside surface of the covering material 33c, the wainscot panel 50 and the pier panel 51 are covered with the film or coating 25.

In the description of the embodiment of FIG. 10, the construction of joint sections at which the wainscot panel and the pier panel are joined to the belt rail has been explained as an example. The construction of the joint sections of adjacent outside plate and the framing is applicable to the joint sections between the pier and the frieze board, between the frieze board and the roof outside plate, and between adjacent roof outside plates and adjacent end outside plates.

Figure 11:
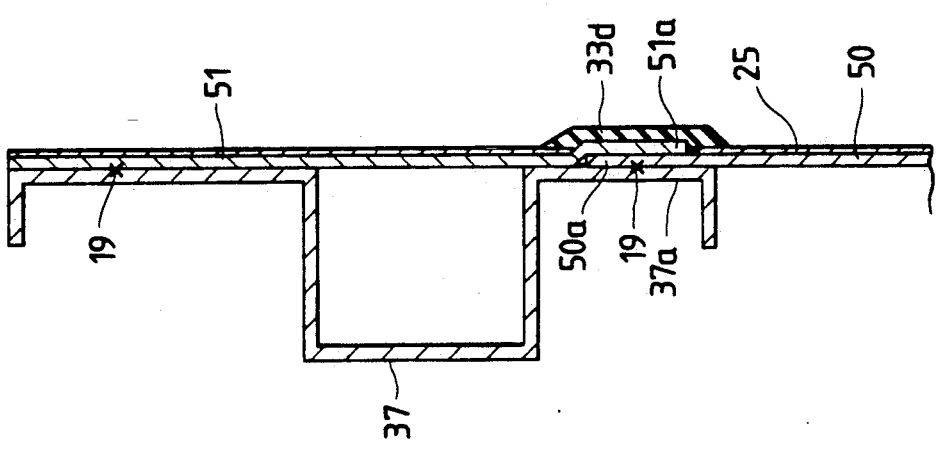
FIG. 11 is a sectional view of a plurality of outside plates and framings according to an eighth embodiment of the present invention.

In the embodiment of FIG. 11, the mounting construction to install the wainscot panel 50 and the pier panel 51 to the belt rail 37 is identical to that in the embodiment of FIG. 10. Namely, the upper end section 50a of the wainscot panel 50 and the lower end section 51a of the pin panel 51 are lap-jointed at the joggled section. Also, the joint section of the upper end section 50a and the lower end section 51a is joined to the outside plate joint surface 37a of the belt rail 37. The upper end section 50a of the wainscot plate 50, the lower end section 51a of the pier panel 51, and the belt rail 37 are joined by spot welding, the joint section being represented by numeral 19. On the outside surfaces of the wainscot panel 50 and the pier panel 51 are directly formed the film or coating 25. In the outside surface of the film or coating 25, a portion corresponding to the joggled section formed at the lower end section 51a of the pier panel 51 is covered with the covering material 33d. The covering material 33d is wide enough to cover the joggled section of the pier panel 51 fully, and is thick enough to cover the joggled section of the pier panel 51 so fully that the joggled section can not be recognized from the outside surface of the covering material 33d.

According to the construction of the car body of the embodiment of FIG. 11, almost the same effect as the embodiment of FIG. 10 can be obtained. Furthermore, the use of different colors between the covering material 33d and the film or coating 25 makes the covering material 33d serve as a decorative line to be formed on the side surface of the car body. Since the color of the covering material 33d differs from the film or coating 25, the joggled section of the pier panel 51 becomes inconspicuous in the outside surface of the car body. This is effective to improve the outward appearance of the car body surfaces. The attachment of the covering material 33d on the car body can be performed with ease by using a covering material produced of a synthetic resin tape with an adhesive on the side which comes in contact with the film or coating 25.

In the embodiment of FIG. 11, the construction of the joint section to join the wainscot panel and the pier panel to the belt rail has been explained as an example. The construction of the joint section between adjacent outside panel and the framing is applicable to joint sections to join the pier panel to the frieze board, the frieze board to the roof outside plate, and adjacent roof outside plates to adjacent end outside plates.

Figure 12:
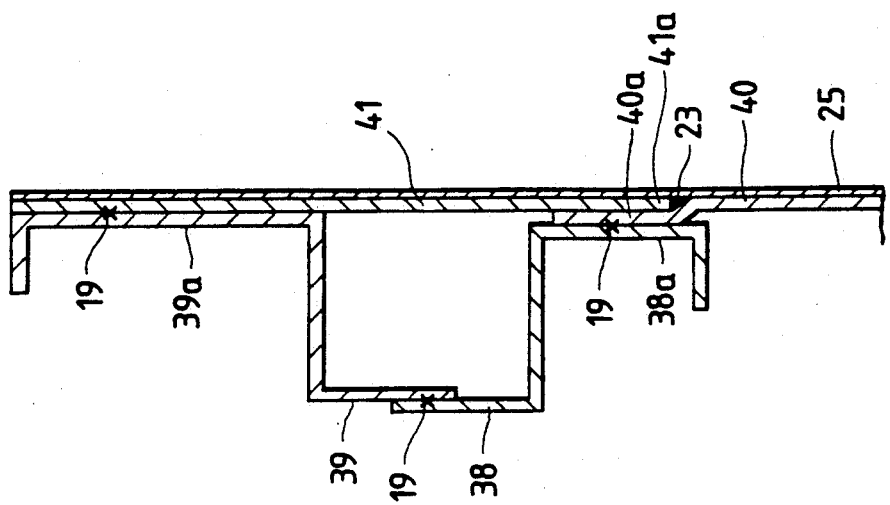
FIG. 12 is a sectional view of a plurality of outside plates and framings according to a ninth embodiment of the present invention.

The construction of the car body according to the embodiment of FIG. 12 including the joint construction of the wainscot panel 40 and the pier panel 41 is identical to those described in the embodiment of FIG. 8. The wainscot panel 40 and the pier panel 41 are joined to the belt rails 38 and 39 which differ in the position of the outside plate joint surface. The belt rails 38 and 39 have a Z-sectional form. The wainscot panel 40 and the pier panel 41 are joined with the lower end 41a of the pier panel 41 lapped on the joggled section formed in the upper end section 40a of the wainscot panel 40. The outside plate joint surface 38a of the belt rail 38 is off from the outside plate joint surface 39a of the belt rail 39. That is, the outside plate joint surface 38a is set on the inside of the car body from the outside plate joint surface 39a. This difference in size agrees with the thickness of the wainscot panel 40. On the outside plate joint surface 38a of the belt rail 38 is joined the surface of the upper end section 40a inside the car body. To the outside joint surface 39a of the belt rail 39 is joined other than the lower end section 41a of the pier panel 41. To join the belt rail 38 to the belt rail 39, the belt rail 38 to the wainscot panel 40, the belt rail 39 to the pier panel 41, each joint section is joined by spot welding, the joint section being indicated by the numeral 19. Putty 23 is filled in a recess formed by both the end of the lower end section 41a of the pier panel 41 and the wainscot panel 40. Accordingly, the outside surfaces of the wainscot panel 40, the putty 23 and the pier panel 41 are formed level. On the outside surfaces of the wainscot panel 40, the putty 23 and the pier panel 41 is formed a film or coating 25.

A similar effect as in the embodiment of FIG. 8 can be obtained by using the construction described in the embodiment of FIG. 12. In the construction of the embodiment of FIG. 12, the belt rails 38 and 39 are arranged in shifted positions, forming the framing. Therefore, it is unnecessary to form a recess by joggling a flat plate and the belt rails 38 and 39 can be manufactured easier than those stated in the embodiment of FIG. 8. The belt rails 38 and 39 are joined with flanges positioned on opposite sides of the outside plate joint surface in a lapped state. Using a lap-joint to join the belt rails 38 and 39 and each flange can easily shift the outside plate joint surfaces 38a and 39a. In this case, however, this type of joint of these belt rails 38 and 39 is limited to only when a joint section at which adjacent outside plates are lapped to each other and another joint section at which the outside plate is joined separately to the framing are located close to each other.

In the description of the embodiment of FIG. 12, the construction of joint sections to join the wainscot panel and the pier panel to the belt rail has been explained as an example. The construction of the joint section between the adjustment outside plates and the framing is also applicable to joint sections between the pier panel and the frieze board, between the frieze board and the roof outside plate, and between adjacent roof outside plate and adjacent end outside plate.

While only certain embodiments of the present invention have been described, it will be apparent to those skilled in the art that various changes and modifications may be made therein without departing from the spirit and scope of the present invention as claimed.

What is claimed is:

1. A car body for railway rolling stock including two end constructions, two side constructions, a roof construction and an underframe, said side constructions comprising a plurality of outside plates and a plurality of frame members joined to each other, said plurality of outside plates being made of a ferrous material and sized to fit on an outer surface of said framing, two of said plurality of said outside plates being disposed adjacent to each other, a joggled section formed in one end of one of said two outside plates so as to enable adjacent ends of said two outside plates to be disposed in an overlapping condition, said jogged section having a depth corresponding to a thickness of the other of said two outside plates, said frame members include two outside plate joining surfaces, one of said joining surfaces being located inwardly of the car body and the other joining surface being located outwardly of said car body by a distance corresponding to the depth of said joggled section, the adjacent ends of said outside plates in the overlapped condition being fitted into one of said outside plate joining surfaces, wherein said plurality of outside plates are joined to said framing by spot welding at a periphery thereof and at the adjacent ends of the outside plates in the overlapped condition, and wherein a coating is provided on an outer surface of each of said outside plates.

* * * * *